(12) United States Patent
Miyazaki

(10) Patent No.: US 11,376,890 B2
(45) Date of Patent: Jul. 5, 2022

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 508 days.

(21) Appl. No.: 16/394,300

(22) Filed: Apr. 25, 2019

(65) Prior Publication Data

US 2019/0351710 A1 Nov. 21, 2019

(30) Foreign Application Priority Data

May 17, 2018 (JP) .............................. JP2018-095681

(51) Int. Cl.
*B60C 11/03* (2006.01)
*B60C 11/12* (2006.01)
*B60C 11/13* (2006.01)

(52) U.S. Cl.
CPC ...... *B60C 11/0304* (2013.01); *B60C 11/1236* (2013.01); *B60C 11/13* (2013.01); *B60C 2011/0346* (2013.01)

(58) Field of Classification Search
CPC ..... B60C 2011/0346; B60C 2011/0374; B60C 11/01
See application file for complete search history.

(56) References Cited

U.S. PATENT DOCUMENTS

| | | | | |
|---|---|---|---|---|
| 2009/0229721 A1* | 9/2009 | Ikeda | ................. | B60C 11/0309 152/209.18 |
| 2009/0255614 A1* | 10/2009 | Ebiko | ................. | B60C 11/0306 152/209.8 |

FOREIGN PATENT DOCUMENTS

| | | | |
|---|---|---|---|
| EP | 2 108 531 A2 | | 10/2009 |
| JP | S60-179306 A | | 9/1985 |
| JP | S60-255506 A | | 12/1985 |
| JP | H11-115418 A | | 4/1999 |
| JP | H11-147407 A | | 6/1999 |
| JP | 2002264612 A | * | 9/2002 |
| JP | 2013-220759 A | | 10/2013 |
| JP | 2015171872 A | * | 10/2015 |
| JP | 2016-007861 A | | 1/2016 |

(Continued)

OTHER PUBLICATIONS

English translation of WO-2017071843-A1 by EPO. (Year: 2017).*

(Continued)

*Primary Examiner* — Leith S Shafi
*Assistant Examiner* — Inja Song
(74) *Attorney, Agent, or Firm* — Westerman, Hattori, Daniels & Adrian, LLP

(57) ABSTRACT

A pneumatic tire according to the present embodiment includes a shoulder main groove that is disposed on one side in a width direction from a tire equatorial plane and extends in a tire circumferential direction, a shoulder land portion that is formed between a ground contact end and the shoulder main groove, and a plurality of slits that divide the shoulder land portion into a plurality of blocks in the tire circumferential direction. The shoulder main groove is formed of a zigzag groove in which an inward bent portion and an outward bent portion are alternately and repeatedly disposed, and angles of the slits with respect to the tire width direction are provided to be 10 degrees or less.

5 Claims, 5 Drawing Sheets

(56) References Cited

FOREIGN PATENT DOCUMENTS

WO      2017/071843 A1    5/2017
WO    WO-2017071843 A1 *   5/2017   ............. B60C 11/01

OTHER PUBLICATIONS

English translation of JP-2015171872-A by EPO. (Year: 2015).*
English translation of JP-2002264612-A by EPO. (Year: 2002).*
Office Action dated Jan. 25, 2021, issued in counterpart CN Application No. 201910264346.5, with English Translation. (9 pages).
Office Action dated Feb. 9, 2022, issued in counterpart JP Application No. 2018-095681, with English Translation. (6 pages).
Office action dated Feb. 16, 2022, issued in counterpart DE Application No. 10 2019 111 997.9, with English Translation. (7 pages).

* cited by examiner

PNEUMATIC TIRE

BACKGROUND OF THE INVENTION

Field of the Invention

The present invention relates to a pneumatic tire.

Background Art

In the related art, a pneumatic tire is known in which a narrow groove-like slit opened in a shoulder main groove is provided in a shoulder land portion formed between the shoulder main groove and a ground contact end, and the shoulder land portion is formed by a block row in which a plurality of blocks are arranged in a tire circumferential direction (for example, refer to JP-A-2013-220759).

In such a pneumatic tire, in a case where the shoulder main groove is formed of a zigzag groove in which an inward bent portion and an outward bent portion are alternately and repeatedly disposed in the tire circumferential direction, and the slit is connected to the inward bent portion and the outward bent portion, the shoulder land portion is formed of a block row in which two types of blocks having different shapes are alternately arranged in the tire circumferential direction.

In the land portion formed of the block row, although uneven wear with different amounts of wear may occur on a tread side and a kick side of the block called heel and toe wear, in a case where the block row forming the shoulder land portion is formed of a plurality of types of blocks having different shapes, since the rigidity of the tread side and the kick side is different for each block shape, complex uneven wear occurs in which the amount of wear differs for each block shape.

SUMMARY OF THE INVENTION

Therefore, an object of the present invention is to provide a pneumatic tire capable of suppressing uneven wear generated on a shoulder land portion, in the pneumatic tire in which a shoulder main groove divides the shoulder land portion formed between the zigzag should main groove in which an inward bent portion and an outward bent portion are alternately and repeatedly disposed in a tire circumferential direction and the ground contact end in the tire circumferential direction by a slit.

According to an aspect of the present invention, there is provided a pneumatic tire including a shoulder main groove that is disposed on one side in a width direction from a tire equatorial plane and extends in a tire circumferential direction, a shoulder land portion that is formed between a ground contact end and the shoulder main groove, and a plurality of slits that divide the shoulder land portion into a plurality of blocks in the tire circumferential direction, in which the shoulder main groove is formed of a zigzag groove in which an inward bent portion and an outward bent portion are alternately and repeatedly disposed, the slits include a first slit connected to the inward bent portion, and a second slit connected to the outward bent portion, and angles of the first slit and the second slit with respect to the tire width direction are 10 degrees or less.

According to the present invention, the slit dividing the shoulder land portion in the tire circumferential direction is set at 10 degrees or less with respect to the tire width direction, and the angles of the corner portions of the blocks interposed by the shoulder main groove and the slit are substantially equal to each other on one side and the other side in the tire circumferential direction across the slit. Therefore, the rigidity on a tread side and a kick side of each of the blocks can be equalized, and uneven wear generated on the shoulder land portion can be suppressed.

DETAILED DESCRIPTION OF THE INVENTION

Hereinafter, an embodiment of the present invention will be described with reference to the drawings.

A pneumatic tire according to the embodiment is not illustrated, and is configured to include a pair of left and right bead portions and sidewall portions, and a tread portion provided between both of the sidewall portions so as to connect radially outer end portions of the left and right sidewall portions. The pneumatic tire can adopt a general tire structure except for a tread pattern.

Figure 1:
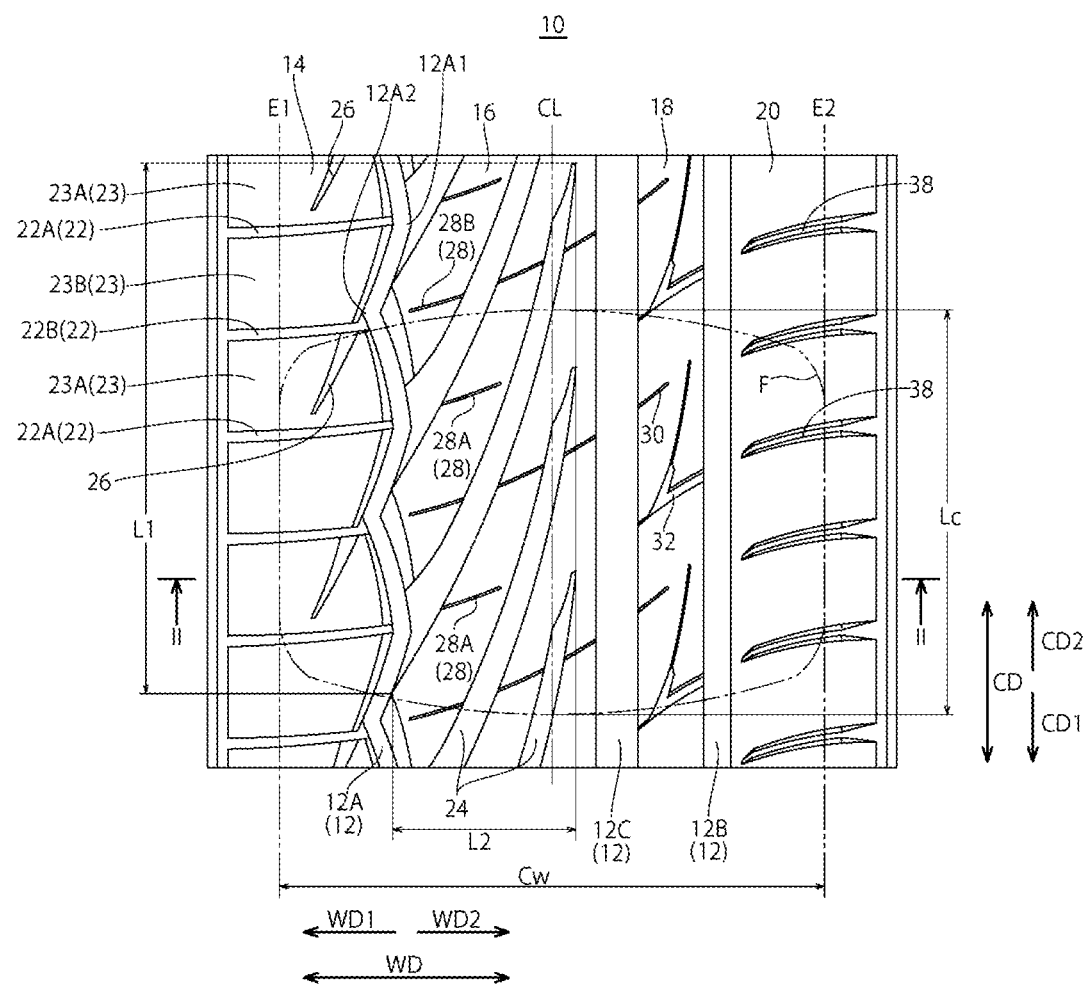
FIG. 1 is a developed view illustrating a tread pattern of a pneumatic tire according to an embodiment of the present invention.

In FIG. 1, a reference sign F indicates a grounding shape in a state where the pneumatic tire is mounted on a normal rim, is placed vertically on a flat road surface in a state of being filled with a normal internal pressure, and is applied with a normal load. The reference signs E1 and E2 indicate ground contact ends in the same state. The reference sign E1 indicates the ground contact end on one side WD1 in a tire width direction (hereinafter, may be referred to as first ground contact end). The reference sign E2 indicates the ground contact end on the other side WD2 in the tire width direction (hereinafter, may be referred to as second ground contact end).

In addition, each dimension in the present specification is in an unloaded normal condition in which the pneumatic tire is mounted on the normal rim and filled with the normal internal pressure. In addition, a ground contact length Lc on a tire equator is a ground contact length on a tire equatorial plane in a state where the pneumatic tire is mounted on the normal rim, is filled with the normal internal pressure to be placed vertically on the flat road surface, and is applied with the normal load. A ground contact width Cw is a width between the ground contact ends E1 and E2 on both sides grounding the road surface in the above state.

The normal rim is a rim that specified by the standard for each tire in the standard system including the standard that the tire is based on. For example, in the case of JATMA, it is a standard rim, in the case of TRA, it is a "design rim", and in the case of ETRTO, it is a "measuring rim". The normal internal pressure is an air pressure specified by each standard for each tire in the standard system including the standard that the tire is based on. In the case of JATMA, it is a highest air pressure, in the case of TRA, it is a maximum value described in the table "tire load limits at various cold inflation pressures", and in the case of ETRTO, it is an "inflation pressure".

In addition, the normal load is a load specified by each standard for each tire in the standard system including the standard that the tire is based on. In the case of JATMA, it is a maximum load capacity, in the case of TRA, it is a maximum value described in the above table, and in the case of ETRTO, it is a "load capacity".

As illustrated in FIG. 1, on a tread rubber surface of a tread portion 10, a plurality of main grooves 12 extending in a tire circumferential direction CD are provided. In this example, three are formed at intervals in a tire width direction WD.

Specifically, a first shoulder main groove 12A provided on the one side WD1 in a tire width direction (left side in FIG. 1) from the tire equatorial plane CL, a second shoulder main groove 12B provided on the other side WD2 in the tire width direction (right side in FIG. 1) from the tire equatorial plane CL, and a center main groove 12C are provided on the tread rubber surface of the tread portion 10.

The first shoulder main groove 12A is a zigzag groove in which inward bent portions 12A1 and outward bent portions 12A2 are alternately and repeatedly disposed in the tire circumferential direction CD. That is, the first shoulder main groove 12A is continuously connected in the tire circumferential direction CD while being bent with amplitude in the tire width direction WD.

The second shoulder main groove 12B is a straight groove continuously connected in the tire circumferential direction CD, and is disposed at a position closest to the other side WD2 in the tire width direction.

The center main groove 12C is a straight groove continuously connected in the tire circumferential direction CD, and is provided between the first shoulder main groove 12A and the second shoulder main groove 12B.

In the tread portion 10, a plurality of land portions are partitioned by a main groove 12 in the tire width direction WD. Specifically, a first shoulder land portion 14 formed between the first ground contact end E1 and the first shoulder main groove 12A, a first central land portion 16 interposed between the first shoulder main groove 12A and the center main groove 12C (that is, formed on the other side of the first shoulder main groove 12A in the tire width direction), a second central land portion 18 formed between the center main groove 12C and the second shoulder main groove 12B, and a second shoulder land portion 20 formed between the second ground contact end E2 and the second shoulder main groove 12B are provided in the tread portion 10.

The first shoulder land portion 14 is provided with a plurality of slits 22 and a plurality of second inclined grooves 26 at intervals in the tire circumferential direction CD.

Figure 3:
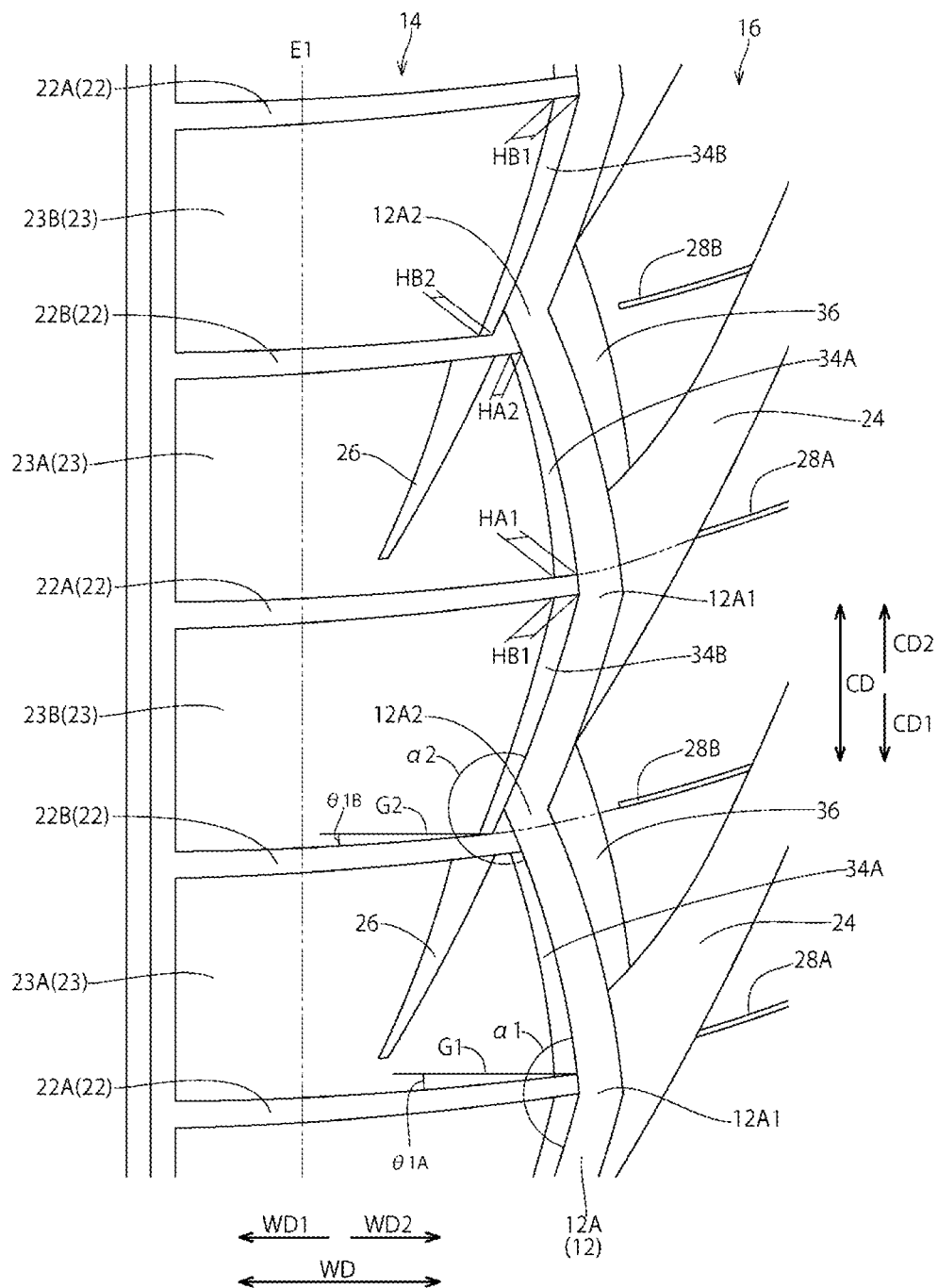
FIG. 3 is an enlarged view of a main part in a vicinity of a first shoulder land portion of the tread pattern.

As illustrated in FIGS. 1 and 3, the slits 22 provided in the first shoulder land portion 14 divide the first shoulder land portion 14 in the tire circumferential direction CD to form a plurality of blocks 23. That is, the first shoulder land portion 14 forms block rows in which the plurality of blocks 23 are arranged in the tire circumferential direction CD.

In the slit 22, the other side WD2 in the tire width direction is provided with a first slit 22A connected to the inward bent portion 12A1 and a second slit 22B connected to the outward bent portion 12A2 of the first shoulder main groove 12A. The first slit 22A and the second slit 22B extend from the first shoulder main groove 12A to the one side WD1 in the tire width direction beyond the first ground contact end E1. The length along the tire width direction WD of the first slit 22A connected to the inward bent portion 12A1 is longer than that of the second slit 22B connected to the outward bent portion 12A2.

The first slit 22A and the second slit 22B may be provided in parallel to the tire width direction WD, or may be gradually inclined toward one side CD1 in the tire circumferential direction (downward in FIG. 1) as approaching the one side WD1 in the tire width direction. In a case where the first slit 22A and the second slit 22B are inclined with respect to the tire width direction WD, the angles θ1A and θ1B of the first slit 22A and the second slit 22B with respect to the tire width direction WD are 10 degrees or less.

That is, the first slit 22A is provided along a direction substantially bisecting the angle formed by the inward bent portion 12A1 of the first shoulder main groove 12A (for example, direction within ±10 degrees from the direction G1 bisecting the angle α1 formed by the inward bent portion 12A1 of the first shoulder main groove 12A). The second slit 22B is provided along a direction substantially bisecting the angle formed by the outward bent portion 12A2 of the first shoulder main groove 12A (for example, direction within ±10 degrees from the direction G2 bisecting the angle α2 formed by the outward bent portion 12A2 of the first shoulder main groove 12A).

In addition, the first slit 22A and the second slit 22B may be recessed grooves linearly extending in the tire width direction WD, or may be curved recessed grooves gradually curved as illustrated in FIG. 1. In a case where the first slit 22A and the second slit 22B are the curved recessed grooves, although the inclination angle with respect to the tire width direction WD changes depending on the position in the tire width direction WD, in that case, the maximum value of the angle with respect to the tire width direction WD (in FIG. 1, angle at the connecting portion with the first shoulder main groove 12A) is 10 degrees or less.

The plurality of blocks 23 forming the first shoulder land portion 14 is provided with a first block 23A and a second block 23B. In the first block 23A, the one side CD1 in the tire circumferential direction is partitioned by the first slit 22A, and the other side CD2 in the tire circumferential direction is partitioned by the second slit 22B. The one side CD1 in the tire circumferential direction of the second block 23B is partitioned by the second slit 22B, and the other side CD2 in the tire circumferential direction is partitioned by the first slit 22A. The first block 23A and the second block 23B are alternately arranged and form the first shoulder land portion 14 in the tire circumferential direction CD.

Each of the plurality of first blocks 23A forming the first shoulder land portion 14 is provided with the second inclined groove 26 whose one end is open to the first shoulder main groove 12A. The second inclined groove 26 is provided on the extension of a first inclined groove 24. That is, the second inclined groove 26 is connected to the outward bent portion 12A2, and is inclined so as to be directed to the one side WD1 in the tire width direction as approaching the one side CD1 in the tire circumferential direction. A groove depth Dd of the second inclined groove 26 is smaller than groove depths Da and Dc of the first shoulder main groove 12A and the slit 22 (refer to FIG. 2), and is gradually narrowed in the groove width as approaching the one side WD1 in the tire width direction (that is, as separating from the first shoulder main groove 12A).

Here, as an example of dimensions, the groove depth Da of the first shoulder main groove 12A can be 6 to 10 mm, the groove depth Db1 to Db3 of the first inclined groove 24 can be 6 to 10 mm, the groove depth Dc of the slit 22 can be 4 to 8 mm, and the groove depth Dd of the second inclined groove 26 can be 1 to 2 mm.

In addition, as illustrated in FIG. 3, in the first block 23A and the second block 23B forming the first shoulder land portion 14, a first chamfered portion 34A and a second chamfered portion 34B are provided on the groove wall facing the first shoulder main groove 12A.

A surface width of the first chamfered portion 34A provided in the first block 23A gradually increases from the outward bent portion 12A2 side of the first shoulder main groove 12A as approaching the one side CD1 in the tire circumferential direction. A surface width of the second chamfered portion 34B provided in the second block 23B gradually increases from the outward bent portion 12A2 side of the first shoulder main groove 12A as approaching the other side CD2 in the tire circumferential direction.

That is, the surface widths of the first chamfered portion 34A and the second chamfered portion 34B gradually increase in the direction from the outward bent portion 12A2 side toward the inward bent portion 12A1 of the first shoulder main groove 12A. At that time, in the first chamfered portion 34A and the second chamfered portion 34B, it is preferable that the surface widths HA1 and HB1 on the inward bent portion 12A1 side of the first shoulder main groove 12A are twice or less of the surface widths HA2 and HB2 on the outward bent portion 12A2 side.

The surface width is a length along the slopes of the chamfered portions 34A and 34B in the width direction of the first shoulder main groove 12A.

As described above, when the surface widths HA1 and HB1 on the inward bent portion 12A1 side of the first shoulder main groove 12A are twice or less the surface widths HA2 and HB2 of the outward bent portion 12A2, even with the first chamfered portion 34A and the second chamfered portion 34B, the zigzag shape of the first shoulder main groove 12A can be maintained. Therefore, the flow velocity of the air passing through the inside of the first shoulder main groove 12A at the time of traveling can be reduced, and noise due to air column resonance can be suppressed.

The first central land portion 16 is provided with a plurality of first inclined grooves 24 and a plurality of sipes 28 at intervals in the tire circumferential direction CD. The first inclined groove 24 is a groove in which the one side WD1 in the tire width direction is open to the inward bent portion 12A1 of the first shoulder main groove 12A and the other side WD2 in the tire width direction terminates in the first central land portion 16, and extends in a direction inclined with respect to the tire circumferential direction.

The first central land portion 16 is provided with a tapered surface 36 which is inclined so that the groove width of the first shoulder main groove 12A widens as approaching the ground contact surface from the groove bottom side on the wall surface facing the first shoulder main groove 12A.

The first inclined groove 24 extends in the tire circumferential direction CD while separating from the first shoulder main groove 12A toward the other side WD2 in the tire width direction, so that the length L1 along the tire circumferential direction CD is 90% or more and 180% or less of the ground contact length Lc on the tire equator, and the length L2 along the tire width direction WD to be 30% or more of the ground contact width Cw.

The plurality of the first inclined grooves 24 are provided at intervals in the tire circumferential direction CD as described above. At this time, the first inclined grooves 24 adjacent to each other in the tire circumferential direction CD are provided in parallel in the tire circumferential direction CD so that at least a portion of the projection views projected in the tire circumferential direction CD overlap each other. That is, the first inclined grooves 24 are provided at intervals in the tire circumferential direction CD so that a portion of the first inclined grooves 24 overlaps the first inclined grooves 24 adjacent in the tire circumferential direction CD in the tire width direction WD.

It is preferable that in the first inclined groove 24, an inclination angle with respect to the tire circumferential direction CD changes so as to approach the tire circumferential direction CD as approaching the other side WD2 in the tire width direction from the first shoulder main groove 12A (that is, to reduce angle to the tire circumferential direction CD). In addition, it is preferable that the first inclined groove 24 has a tapered shape in which the groove width along the tire width direction WD is reduced as approaching the other side WD2 in the tire width direction from the first shoulder main groove 12A.

Figure 2:
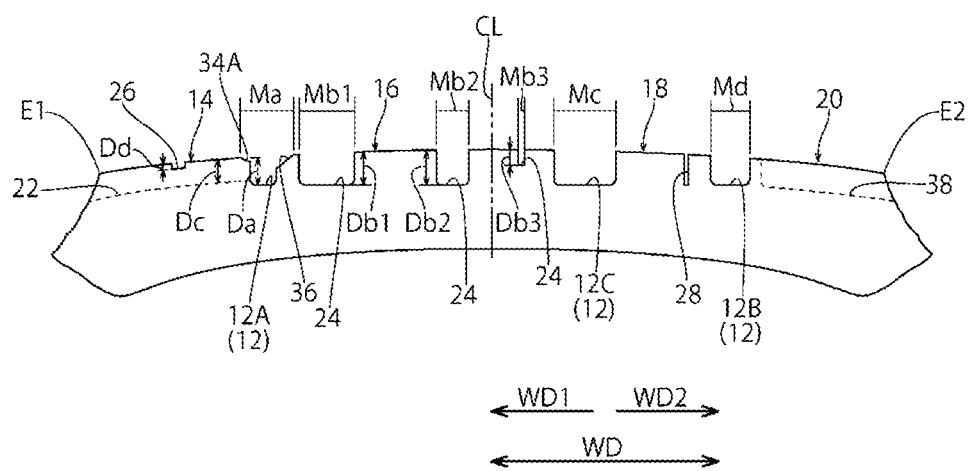
FIG. 2 is a cross-sectional view taken along line II-II of FIG. 1.

In addition, in the first inclined groove 24, a groove depth Db3 on the first shoulder main groove 12A side may be shallower than a groove depth Db1 on the other side WD2 in the tire width direction (refer to FIG. 2).

The plurality of sipes 28 are cuts having a minute groove width (normally 1 mm or less), and more specifically, a groove in which a pneumatic tire mounted on a normal rim and filled with a normal internal pressure contacts the ground, and under the condition that a normal load is applied thereto, the opening portion to the ground contact surface closes.

The sipe 28 is provided with a first sipe 28A disposed on the other side WD2 in the tire width direction of the first slit 22A and a second sipe 28B disposed on the other side WD2 in the tire width direction of the second slit 22B. The first sipe 28A and the second sipe 28B are alternately disposed in the tire circumferential direction CD.

The first sipe 28A and the second sipe 28B are gradually curved so that the angle with respect to the tire circumferential direction CD reduces as approaching the other side WD2 in the tire width direction from the first shoulder main groove 12A side.

In the first sipe 28A, the one side WD1 in the tire width direction is open to the first inclined groove 24, and the groove wall of the one side CD1 in the tire circumferential direction of the first sipe 28A extends along an extension line in which the groove wall of the other side CD2 in the tire circumferential direction of the first slit 22A is smoothly extended to the other side WD2 in the tire width direction. In the first sipe 28A, the other side WD2 in the tire width direction terminates in the first central land portion 16 without intersecting the first inclined groove 24.

In the second sipe 28B, the one side WD1 in the tire width direction terminates in the first central land portion 16, and the groove wall of the one side CD1 in the tire circumferential direction of the second sipe 28B extends along an extension line in which the groove wall of the other side CD2 in the tire circumferential direction of the second slit 22B is smoothly extended to the other side WD2 in the tire width direction. The second sipe 28B is provided to intersect the first inclined groove 24, and the other side WD2 in the tire width direction is open to the center main groove 12C.

The second central land portion 18 is provided with a third sipe 30 extending along an extension line in which the second sipe 28B provided in the first central land portion 16 is extended, and a lateral groove 32.

A plurality of shoulder lateral grooves 38 are provided in the second shoulder land portion 20 at intervals in the tire circumferential direction CD.

The shoulder lateral groove 38 is formed of a recessed groove extending in the tire width direction WD while gradually curving so that the angle with respect to the tire width direction WD reduces as approaching the other side WD2 in the tire width direction.

The shoulder lateral groove 38 terminates in the second shoulder land portion 20 without the one side WD1 in the tire width direction opening in the second shoulder main groove 12B, and the other side WD2 in the tire width direction extends beyond the second ground contact end E2. The second shoulder land portion 20 forms a rib-like land portion connected in the tire circumferential direction CD on the one side WD1 in the tire width direction by such a shoulder lateral groove 38.

The shoulder lateral grooves 38 may be provided in parallel to the tire width direction WD, or may be provided to be gradually inclined with respect to the tire width direction WD. In addition, the shoulder lateral groove 38 may be a linearly extending recessed groove, or may be a gradually curving curved recessed groove.

Figure 4:
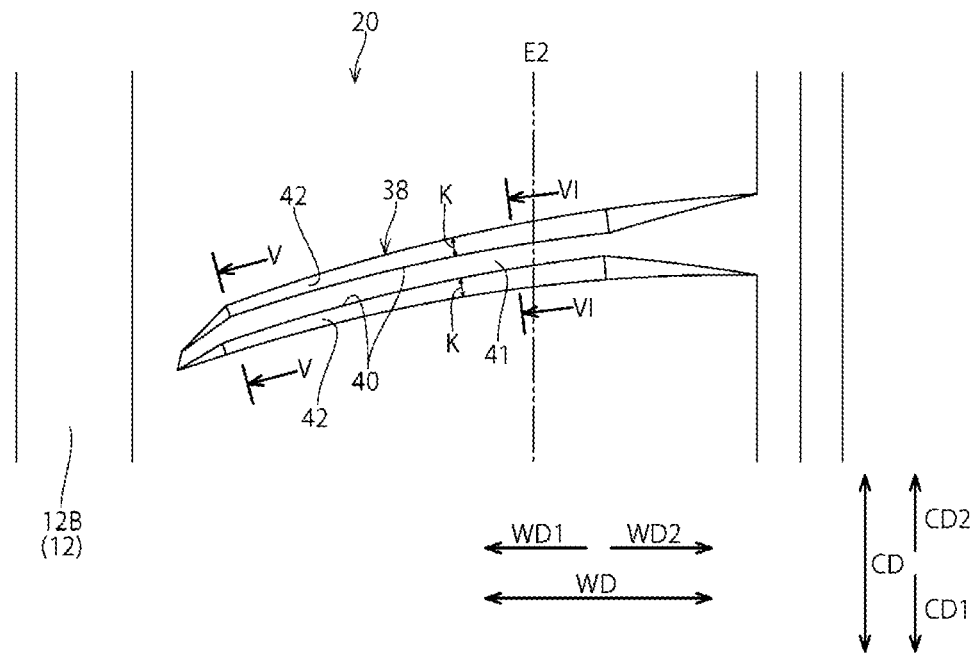
FIG. 4 is an enlarged view of a main part in a vicinity of a second shoulder land portion of the tread pattern.
Figure 5:
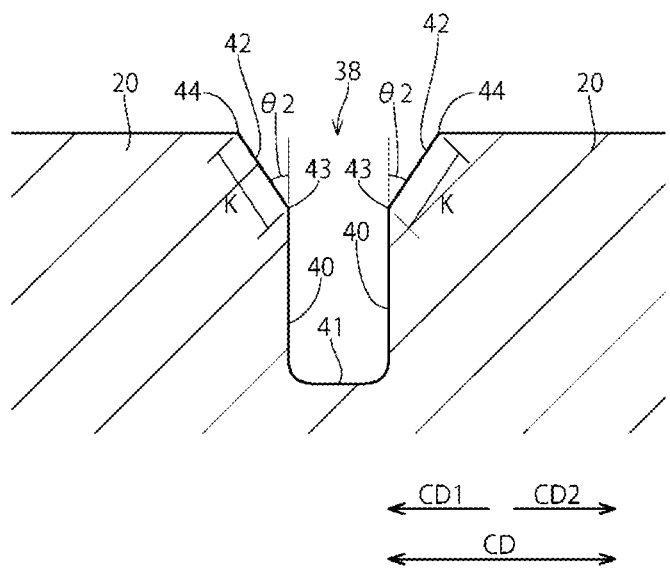
FIG. 5 is a cross-sectional view taken along line V-V in FIG. 4.
Figure 6:
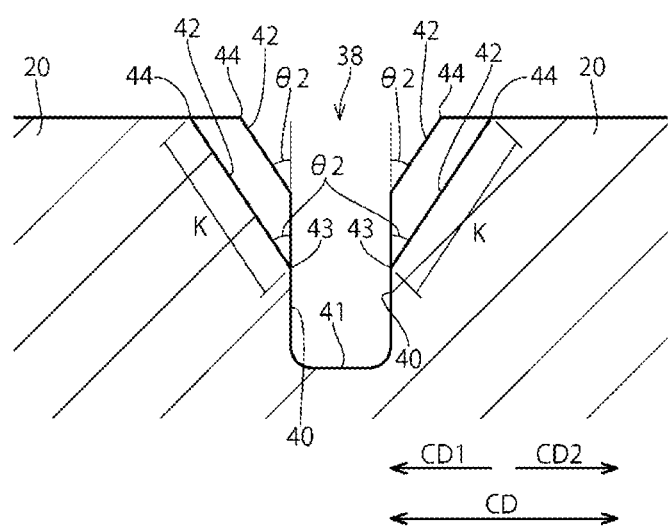
FIG. 6 is a cross-sectional view taken along line VI-VI in FIG. 4.

As illustrated in FIGS. 4 to 6, the shoulder lateral grooves 38 are partitioned by a pair of groove walls 40 provided at predetermined intervals in the tire circumferential direction CD, a groove bottom 41 connecting the pair of groove walls 40 inward the groove wall 40 in the tire radial direction, and a pair of tapered surfaces 42 provided on the outer (ground contact surface) side of the pair of groove walls 40 in the tire radial direction.

The pair of groove walls 40 rise from the groove bottom 41 substantially in the tire radial direction, and are provided in parallel to each other at a constant interval over the entire tire width direction WD.

The pair of tapered surfaces 42 is separated from each other as approaching the ground contact surface from the groove bottom 41 side, and is inclined so that the groove width of the shoulder lateral groove 38 gradually increases. In addition, in the pair of tapered surfaces 42, a length K along the groove width direction of the shoulder lateral groove 38 gradually increases as approaching the second ground contact end E2 from the one side WD1 toward the other side WD2 in the tire width direction. That is, the width of the pair of tapered surfaces 42 increases as approaching from the one side WD1 toward the other side WD2 in the tire width direction.

As illustrated in FIGS. 5 and 6, in the present embodiment, a boundary portion 43 between the tapered surface 42 and the groove wall 40 approaches the groove bottom 41, and a boundary portion 44 between the tapered surface 42 and the ground contact surface extends outside the shoulder lateral groove 38, as approaching the second ground contact end E2 from the one side WD1 to the other side WD2 in the tire width direction, while keeping the angle θ2 of the tapered surface 42 with respect to the groove wall 40 constant.

In the pneumatic tire according to the present embodiment as described above, the angle of the slit 22 dividing the shoulder land portion 14 in the tire circumferential direction is set to 10 degrees or less with respect to the tire width direction WD, and the angles of the corner portions of the block 23 formed by the slit 22 and the first shoulder main groove 12A are substantially equal to each other. Therefore, the rigidity of an edge of the block 23 on the one side CD1 in the tire circumferential direction and an edge of the block 23 on the other side CD2 in the tire circumferential direction can be equalized across the slit 22 and the occurrence of uneven wear can be suppressed.

In addition, in the present embodiment, since the first inclined groove 24 provided in the first central land portion 16 is connected at the inward bent portion 12A1 of the first shoulder land portion 14, a sharp acute land portion is not formed between the first shoulder main groove 12A and the first inclined groove 24. Therefore, it is possible to suppress the occurrence of uneven wear due to a local decrease in rigidity.

In addition, in the present embodiment, since the sipe 28 provided in the first central land portion 16 is positioned on the extension of the slit 22 provided in the first shoulder land portion 14, in cooperation with the slit 22 provided in the first shoulder land portion 14, the first central land portion 16 is likely to be bent in the tire circumferential direction CD, and grounding performance at the first central land portion 16 can be enhanced, and steering stability can be improved.

Hereinbefore, although several embodiments of the present invention are described, these embodiments are presented by way of example only, and are not intended to limit the scope of the invention. These embodiments can be implemented in other various forms, and various omissions, replacements, and changes can be made without departing from the scope of the invention. These embodiments and modifications thereof are included in the invention described in the aspects and the equivalents thereof as well as included in the scope and the gist of the invention.

EXAMPLE

Hereinafter, the present invention will be more specifically described by way of examples, and the present invention is not limited to these examples.

Pneumatic tires (tire size: 225/45R17) of Examples 1 to 3 and Comparative Example 1 were produced on a trial basis. Each of these test tires was prepared with the same tire internal structure and basic tread pattern, and by changing the angle θ (degree) of the first slit 22A and the second slit 22B provided in the first shoulder land portion 14 with respect to the tire width direction WD. The angle θ of each test tire is as illustrated in Table 1. A direction inclined toward one side in the tire circumferential direction as approaching the one side WD1 in the tire width direction with respect to the tire width direction WD is set to be positive.

The following evaluation was performed on each of the test tires of Examples 1 to 3 and Comparative Example 1. Uneven Wear Resistance.

Each test tire is mounted on a rim (17×7.5J), filled with an internal pressure of 230 kPa, mounted on a test vehicle (wagon car), and an uneven wear ratio=(maximum wear amount/minimum wear amount) was calculated for the amount of wear on the tread side and the kick side across the slit 22 in the first shoulder land portion 14 for the tire after traveling 10,000 km on a general road. The fact is described that the closer the uneven wear ratio to 1, the more evenly the wear.

TABLE 1

|  | Comparative Example 1 | Example 1 | Example 2 | Example 3 |
| --- | --- | --- | --- | --- |
| Angle θ (degree) | 15 | 10 | 5 | −7 |
| Uneven wear ratio | 1.9 | 1.5 | 1.05 | 1.2 |

The results are as illustrated in Table 1. The uneven wear ratio was closer to 1 in Examples 1 to 3 compared to in Comparative Example 1, and the uneven wear resistance could be improved.

What is claimed is:

1. A pneumatic tire comprising:
    a shoulder main groove that is disposed on one side in a width direction from a tire equatorial plane and extends in a tire circumferential direction;
    a shoulder land portion that is formed between a ground contact end and the shoulder main groove; and
    slits that divide the shoulder land portion into blocks in the tire circumferential direction,
    wherein the shoulder main groove is formed of a zigzag groove in which each of inward bent portions and each of outward bent portions are alternately and repeatedly disposed,
    wherein the slits include first slits each connected to one of the inward bent portions, and second slits each connected to one of the outward bent portions,
    wherein an angle between one of the first slits and one of the second slits with respect to the tire width direction is 10 degrees or less,
    wherein the pneumatic tire comprises a central land portion that is formed on the other side of the shoulder main groove with respect to the shoulder land portion in the tire width direction; and inclined grooves that are provided in the central land portion at intervals in the tire circumferential direction,
    wherein each of the inclined grooves is a groove in which one end is open to the shoulder main groove and the other end terminates in the central land portion, and extends in a direction inclined to the tire circumferential direction, and is connected to one of the inward bent portions,
    wherein the pneumatic tire comprises sipes that are provided in the central land portion,
    wherein each of the sipes are provided along an imaginary extension line extending from one of the slits,
    wherein the sipes include first sipes each of which is provided along the imaginary extension line extending from one of the first slits and disposed on the other side of the one of the first slits with respect to the shoulder main groove in the tire width direction; and second sipes each of which is provided along the imaginary extension line extending from one of the second slits and disposed on the other side of the one of the second slits with respect to the shoulder main groove in the tire width direction,
    wherein each of the first sipes and each of the second sipes are alternately disposed in the tire circumferential direction, and
    wherein one side of each of the first sipes in the tire width direction is open to one of the inclined grooves.

2. The pneumatic the according to claim 1, wherein the inclined grooves comprise a first inclined groove which overlaps one of the inclined grooves in the tire width direction, the one of the inclined grooves being adjacent to the first inclined groove in the tire circumferential direction.

3. The pneumatic tire according to claim 1, wherein, in the first sipes, the other side of each of the first sipes in the tire width direction terminates in the central land portion without intersecting any of the inclined grooves.

4. The pneumatic tire according to claim 1, further comprising:
    a center main groove that positions the central land portion with the shoulder main groove,
    wherein each of the second sipes is provided to intersect one of the inclined grooves, one side of each of the second sipes in the tire width direction terminates in the central land portion, and the other side of each of the second sipes in the tire width direction is open to the center main groove.

5. The pneumatic tire according to claim 3, further comprising:
    a center main groove that positions the central land portion with the shoulder main groove,
    wherein each of the second sipes is provided to intersect one of the inclined grooves, one side of each of the second sipes in the tire width direction terminates in the central land portion, and the other side of each of the second sipes in the tire width direction is open to the center main groove.

* * * * *